US005289877A

United States Patent [19]

Naegele et al.

[11] Patent Number: 5,289,877

[45] Date of Patent: Mar. 1, 1994

[54] CEMENT MIXING AND PUMPING SYSTEM AND METHOD FOR OIL/GAS WELL

[75] Inventors: Phillip N. Naegele; Ronald E. Dant; Kent J. Dieball; Stanley V. Stephenson; Paul O. Padgett, all of Duncan, Okla.

[73] Assignee: Halliburton Company, Duncan, Okla.

[21] Appl. No.: 974,391

[22] Filed: Nov. 10, 1992

[51] Int. Cl.[5] .................. E21B 33/00; G06F 15/46

[52] U.S. Cl. .................. 166/285; 364/172; 364/502

[58] Field of Search .................. 166/285, 289; 364/132, 364/172, 420, 502

[56] References Cited

U.S. PATENT DOCUMENTS

| | | | |
|---|---|---|---|
| 3,161,203 | 12/1964 | Hathorn et al. | 137/8 |
| 3,379,421 | 4/1968 | Putman | 259/154 |
| 3,908,967 | 9/1975 | Merritt | 259/153 |
| 3,940,600 | 2/1976 | Alexander et al. | 235/151.12 |
| 3,951,208 | 4/1976 | Delano | 166/285 X |
| 4,003,431 | 1/1977 | Novotny et al. | 166/250 |
| 4,265,266 | 5/1981 | Kierbow et al. | 137/101.19 |
| 4,327,759 | 5/1982 | Millis | 137/3 |
| 4,353,482 | 10/1982 | Tomlinson et al. | 222/1 |
| 4,407,369 | 10/1983 | Hutchison et al. | 166/285 X |
| 4,410,106 | 10/1983 | Kierbow et al. | 222/135 |
| 4,427,133 | 1/1984 | Kierbow et al. | 222/77 |
| 4,474,204 | 10/1984 | West | 137/88 |
| 4,538,221 | 8/1985 | Crain et al. | 364/172 |
| 4,538,222 | 8/1985 | Crain et al. | 364/172 |
| 4,571,993 | 2/1986 | St. Onge | 73/151 |
| 4,654,802 | 3/1987 | Davis | 364/502 |
| 4,715,721 | 12/1987 | Walker et al. | 366/132 |
| 4,764,019 | 8/1988 | Kaminski et al. | 366/15 |
| 4,779,186 | 10/1988 | Handke et al. | 364/172 |
| 4,850,750 | 7/1989 | Cogbill et al. | 406/82 |
| 4,858,692 | 8/1989 | Nilsen | 166/285 |
| 4,886,367 | 12/1989 | Bragg et al. | 366/132 |
| 4,916,631 | 4/1990 | Crain et al. | 364/502 |
| 4,918,659 | 4/1990 | Bragg et al. | 366/132 |
| 4,953,097 | 8/1990 | Crain et al. | 364/502 |
| 5,014,218 | 5/1991 | Crain et al. | 364/502 |
| 5,027,267 | 6/1991 | Pitts et al. | 364/172 |
| 5,103,908 | 4/1992 | Allen | 166/285 |
| 5,114,239 | 5/1992 | Allen | 366/6 |

OTHER PUBLICATIONS

"The Ram Recirculating Averaging Mixer for Consistent Slurry Weight", BJ Hughes Services brochure.

"Surface Cementing Equipment Mixing Systems", Halliburton Services brochure.

"New BJ PSB Precision Slurry Blender", Byron Jackson Inc. Brochure.

"The Magcobar Cementing System", Magcobar Dresser Cementing Operations brochure.

"Western Offshore Cementing Services", The Western Company brochure.

"The Pod Has Landed", Dowell Schlumberger Pumping Services brochure.

"ARC System (Automated Remote Control)", Halliburton Services brochure.

"Automatic Proppant Control System", Halliburton Services brochure.

*Primary Examiner*—Thuy M. Bui

*Attorney, Agent, or Firm*—Stephen R. Christian; E. Harrison Gilbert, III

[57] ABSTRACT

A system and method for mixing cement slurries at an oil or gas well site and for pumping such slurries into the well provide automatic combined and interrelated density and pumping control and selectable sequential control of predetermined mixing and pumping stages. Specific conditions automatically controlled include water rate, water pressure, slurry density, recirculating slurry pressure and downhole pump rate. Each of these conditions is the subject of a respective control loop that operates independently, but under control from a central controller. The central controller generates interrelated inlet water, inlet dry cement and outlet downhole pumping control signals responsive to operated-entered desired operating characteristics.

19 Claims, 8 Drawing Sheets

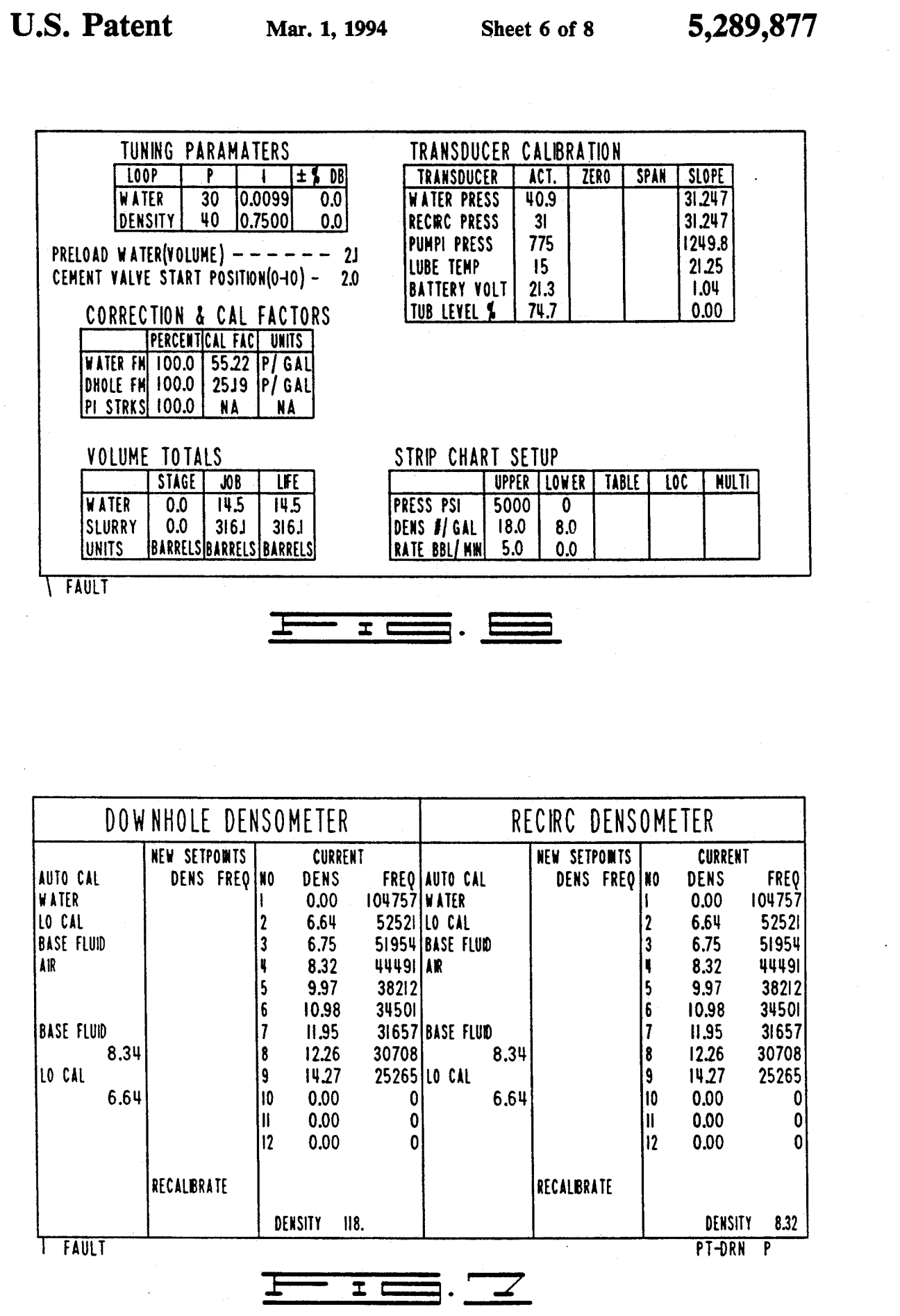

TUNING PARAMATERS

| LOOP | P | I | ±% DB |
|---|---|---|---|
| WATER | 30 | 0.0099 | 0.0 |
| DENSITY | 40 | 0.7500 | 0.0 |

PRELOAD WATER(VOLUME) - - - - - - - 2.1
CEMENT VALVE START POSITION(0-10) - 2.0

CORRECTION & CAL FACTORS

| | PERCENT | CAL FAC | UNITS |
|---|---|---|---|
| WATER FM | 100.0 | 55.22 | P/ GAL |
| DHOLE FM | 100.0 | 25.19 | P/ GAL |
| PI STRKS | 100.0 | NA | NA |

TRANSDUCER CALIBRATION

| TRANSDUCER | ACT. | ZERO | SPAN | SLOPE |
|---|---|---|---|---|
| WATER PRESS | 40.9 | | | 31.247 |
| RECIRC PRESS | 31 | | | 31.247 |
| PUMP1 PRESS | 775 | | | 1249.8 |
| LUBE TEMP | 15 | | | 21.25 |
| BATTERY VOLT | 21.3 | | | 1.04 |
| TUB LEVEL % | 74.7 | | | 0.00 |

VOLUME TOTALS

| | STAGE | JOB | LIFE |
|---|---|---|---|
| WATER | 0.0 | 14.5 | 14.5 |
| SLURRY | 0.0 | 316.1 | 316.1 |
| UNITS | BARRELS | BARRELS | BARRELS |

STRIP CHART SETUP

| | UPPER | LOWER | TABLE | LOC | MULTI |
|---|---|---|---|---|---|
| PRESS PSI | 5000 | 0 | | | |
| DENS #/GAL | 18.0 | 8.0 | | | |
| RATE BBL/MIN | 5.0 | 0.0 | | | |

FAULT

FIG. 6

DOWNHOLE DENSOMETER

| | NEW SETPOINTS DENS | NEW SETPOINTS FREQ | CURRENT NO | CURRENT DENS | CURRENT FREQ |
|---|---|---|---|---|---|
| AUTO CAL | | | | | |
| WATER | | | 1 | 0.00 | 104757 |
| LO CAL | | | 2 | 6.64 | 52521 |
| BASE FLUID | | | 3 | 6.75 | 51954 |
| AIR | | | 4 | 8.32 | 44491 |
| | | | 5 | 9.97 | 38212 |
| | | | 6 | 10.98 | 34501 |
| BASE FLUID | | | 7 | 11.95 | 31657 |
| 8.34 | | | 8 | 12.26 | 30708 |
| LO CAL | | | 9 | 14.27 | 25265 |
| 6.64 | | | 10 | 0.00 | 0 |
| | | | 11 | 0.00 | 0 |
| | | | 12 | 0.00 | 0 |
| | RECALIBRATE | | | | |
| | | | DENSITY | 118. | |

RECIRC DENSOMETER

| | NEW SETPOINTS DENS | NEW SETPOINTS FREQ | CURRENT NO | CURRENT DENS | CURRENT FREQ |
|---|---|---|---|---|---|
| AUTO CAL | | | | | |
| WATER | | | 1 | 0.00 | 104757 |
| LO CAL | | | 2 | 6.64 | 52521 |
| BASE FLUID | | | 3 | 6.75 | 51954 |
| AIR | | | 4 | 8.32 | 44491 |
| | | | 5 | 9.97 | 38212 |
| | | | 6 | 10.98 | 34501 |
| BASE FLUID | | | 7 | 11.95 | 31657 |
| 8.34 | | | 8 | 12.26 | 30708 |
| LO CAL | | | 9 | 14.27 | 25265 |
| 6.64 | | | 10 | 0.00 | 0 |
| | | | 11 | 0.00 | 0 |
| | | | 12 | 0.00 | 0 |
| | RECALIBRATE | | | | |
| | | | DENSITY | 8.32 | |

FAULT PT-DRN P

FIG. 7

AUTO JOB MANAGER SCREEN

MIX STAGE 0 MANUAL STAGING

| | SETPTS | CURRENT | 1 | 2 | 3 | 4 | 5 | 6 | 7 |
|---|---|---|---|---|---|---|---|---|---|
| STAGE NUMBER | | 0 | 1 | 2 | 3 | 4 | 5 | 6 | 7 |
| DENSITY #/GAL | | 15.00 | 15.00 | 685060 | 15342. | 15331. | 685060 | 15342. | 15331. |
| WATER REQ G/SK | | 6.0 | 6.0 | 0.0 | 150157 | 0.0 | 3362.8 | 19.0 | 0.0 |
| YEILD CUFT/SK | | 1.90 | 1.90 | 23749 | 16519. | 51933. | 19008. | 56551. | 62045. |
| MIX RATE BBL/MIN | | 5.0 | 5.0 | 861797 | 117637 | 851033 | 562479 | 228338 | 897498 |
| STAGE SIZE BBL | | 13.0 | 10.0 | 1780.9 | 106.9 | 106.9 | 189336 | 183415 | 191739 |
| ACTUAL BBL | | 0.0 | | | | | | | |
| DIFF BBL | | 1.1 | | | | | | | |
| RUNTIME HOURS | | | 0.03 | 0.00 | 0.00 | 0.00 | 0.00 | 0.00 | 0.00 |
| WATER RATE BBL/MIN | | 2.1 | 2.1 | 0.0 | 0.0 | 0.0 | 0.0 | 0.0 | 0.0 |

ENTER SETPOINTS PRESS: MIX STAGE and ENTER

STAGE ADVANCE PRESS: MIX STAGE and UP KEY

\ FAULT

PRESSURE TABLES

| PRESSURE PSI | JOB REVS | LIFE REVS |
|---|---|---|
| 0 - 1000 | -603883 | 0 |
| 1000 - 2000 | -104626 | 131 |
| 2000 - 3000 | -52521 | 0 |
| 3000 - 4000 | -51954 | 0 |
| 4000 - 5000 | -44491 | 0 |
| 5000 - 6000 | -38212 | 0 |
| 6000 - 7000 | -34501 | 0 |
| 7000 - 8000 | -31656 | 1 |
| 8000 - 9000 | -30708 | 0 |
| 9000 - 10000 | -25263 | 2 |
| 10000 - 11000 | -6632 | 0 |
| 11000 - 12000 | -6197 | 0 |
| 12000 - 13000 | -4728 | 0 |
| 13000 - 14000 | -3370 | 0 |
| 14000 - 15000 | -3370 | 0 |

POWER TABLES

| HHP | JOB REVS | JOB HOURS | LIFE REVS | LIFE HOURS |
|---|---|---|---|---|
| 0 - 50 | -3068 | -4.71 | 132 | 24 |
| 50 - 100 | 5 | 87.76 | 5 | 102 |
| 100 - 150 | 3 | -14.31 | 3 | 0 |
| 150 - 200 | 166 | -12.36 | 166 | 0 |
| 200 - 250 | 3 | -10.61 | 3 | 0 |
| 250 - 300 | 3 | -9.58 | 3 | 0 |
| 300 - 350 | 0 | -8.79 | 0 | 0 |
| 350 - 400 | -17 | -7.68 | 43 | 1 |
| 400 - 450 | -17077 | 9.05 | 0 | 16 |
| TOTALS | NA | 5.78 | NA | 6 |

GEAR DATA

| GEAR | MAX RATE BBL/MIN | MAX PRESS PSI |
|---|---|---|
| 1 | 2.0 | 7164 |
| 2 | 3.7 | 3829 |
| 3 | 4.9 | 2894 |
| 4 | 6.8 | 2054 |
| 5 | 9.1 | 1540 |
| 6 | 10.5 | 1339 |

\ FAULT

CEMENT MIXING AND PUMPING SYSTEM AND METHOD FOR OIL/GAS WELL

BACKGROUND OF THE INVENTION

This invention relates to systems and methods for mixing cement slurries at oil or gas well sites and for pumping such slurries into the wells.

After completing the drilling of an oil or gas well, a cement slurry is typically pumped into the well to isolate the pay zone and provide support for pipe in the well. Important parameters for the cement slurry are density and pumping rate.

Cement density is important for two reasons. First, the density defines the ratio of dry cement powder to water which determines the properties of the slurry and the hydrated cement. These properties include friction pressure, setting time, cement strength, etc. Second, density also maintains proper well control through hydrostatic head of the cement column. The hydrostatic head prevents the pressurized fluids in the reservoir from producing uncontrollably into the well.

Friction pressure is also a factor of pumping rate. A high friction pressure can fracture the formation, thereby allowing the cement to flow out into the reservoir. Also, pumping time is determined by pumping rate. The slurry must be placed in the well within a specified time to prevent the cement from hardening in the drill string.

Another aspect of cementing an oil or gas well is that typically more than one type of cement slurry needs to be prepared at the well site and pumped into the well. This is done sequentially with one slurry being mixed and pumped into the well and then the next being mixed and pumped into the well, pushing the previous slurry or slurries farther into the well. Different slurries that have different densities and different compositions require different control parameters. The total volume of each such slurry needs to be tracked to ensure placement of the respective slurries at desired locations in the well.

Prior systems and methods have provided automatic control of cement density but have not combined this feature with automatic pumping control. These prior systems and methods also have not provided for pre-entering multiple sets of cement mixing and pumping control parameters in such a manner that permits either manual or automatic switching from one set to another for sequentially mixing and pumping different cement slurries into the well. Such a system and method for overcoming these shortcomings is needed to provide improved control of the sequential mixing and pumping of multiple types of cement slurries into an oil or gas well.

SUMMARY OF THE INVENTION

The present invention overcomes the above-noted and other shortcomings of the prior art by providing a novel and improved system and method for mixing cement slurries at an oil or gas well site and for pumping such slurries into the well. The present invention provides selectable sequential control of predetermined mixing and pumping stages and automatic interrelated density and pumping control within each stage. Specific conditions automatically controlled in the preferred embodiment include water rate, water pressure, slurry density, recirculating slurry pressure and downhole pump rate. Each operates independently under control from a central controller, but such independent operation is performed in response to interrelated control signals generated by the controller in response to entered desired operating characteristics.

Broadly, the present invention provides a system for mixing and pumping a cement slurry into an oil or gas well, comprising: a mixing tub; a first pump for pumping cement slurry from the tub into the well; a base fluid flow controller for conducting a base fluid into the tub; a master controller for controlling the first pump and the flow controller so that the mixing of the cement slurry responsive to the base fluid flow controller is related to the pumping of cement slurry by the first pump into the well, the master controller including: means for defining a plurality of desired operating characteristics; and means for generating related control signals in response to the desired operating characteristics; means for operating the first pump in response to at least one of the control signals; and means for operating the base fluid flow controller in response to at least one of the control signals.

The present invention also generally provides a method of mixing and pumping a cement slurry into an oil or gas well, comprising: pumping water through a first control valve into a tub at the well; conducting dry cement through a second control valve into the tub; mixing the water and dry cement into a cement slurry in the tub; recirculating cement slurry out of and back into the tub; pumping cement slurry out of the tub into the well; controlling the first control valve in response to a desired water flow rate and an actual water flow rate; controlling the second control valve in response to a desired slurry density and an actual slurry density; controlling the pumping of cement slurry in response to a desired downhole pump rate and an actual downhole pump rate; and defining the desired water flow rate, the desired slurry density and the desired downhole pump rate from an interrelated common data base of predetermined operating conditions.

The present invention still further provides a method of mixing and pumping a cement slurry into an oil or gas well, comprising: controlling, with a computer, a flow of water into a mixing tub, a flow of dry cement into the mixing tub, and a flow of resultant mixture from the mixing tub into the well; entering into the computer a plurality of operating characteristics for a plurality of different mixtures; and sequentially performing the controlling step for at least two of the plurality of different mixtures so that at least two different mixtures are sequentially prepared in the mixing tub and placed in the well.

Therefore, from the foregoing, it is a general object of the present invention to provide a novel and improved system and method for mixing and pumping a cement slurry into an oil or gas well. Other and further objects, features and advantages of the present invention will be readily apparent to those skilled in the art when the following description of the preferred embodiment is read in conjunction with the accompanying drawings.

BRIEF DESCRIPTION OF THE DRAWINGS

FIGS. 4–11 are different display screens showing graphical interfaces that can be accessed through the operator interface panel to facilitate operator communication with a central controller of the system shown in FIG. 1.

DETAILED DESCRIPTION OF PREFERRED EMBODIMENT

Figure 1A:
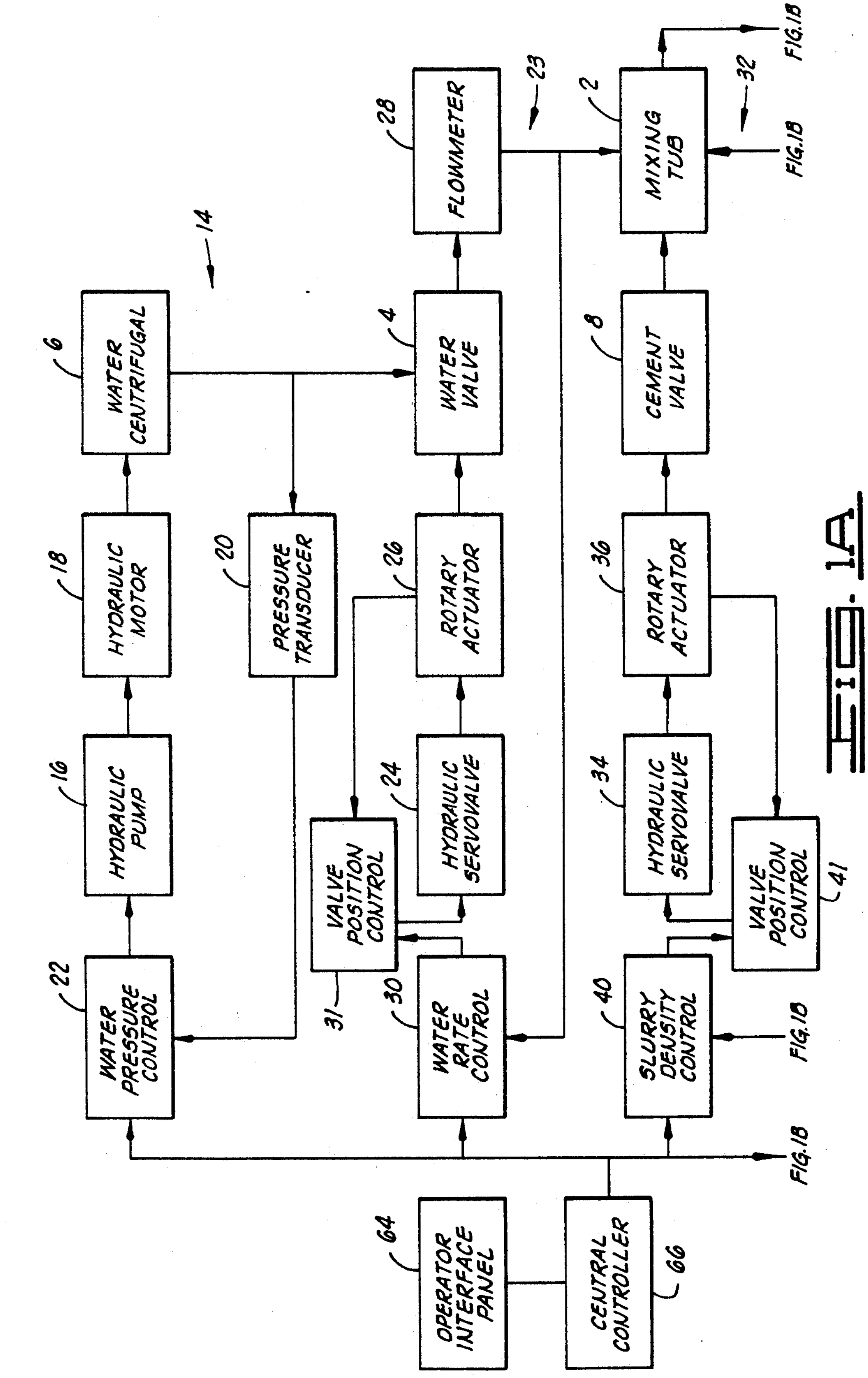
FIGS. 1A and 1B are a block diagram of the control and flow circuit of the preferred embodiment mixing and pumping system of the present invention.
Figure 1B:
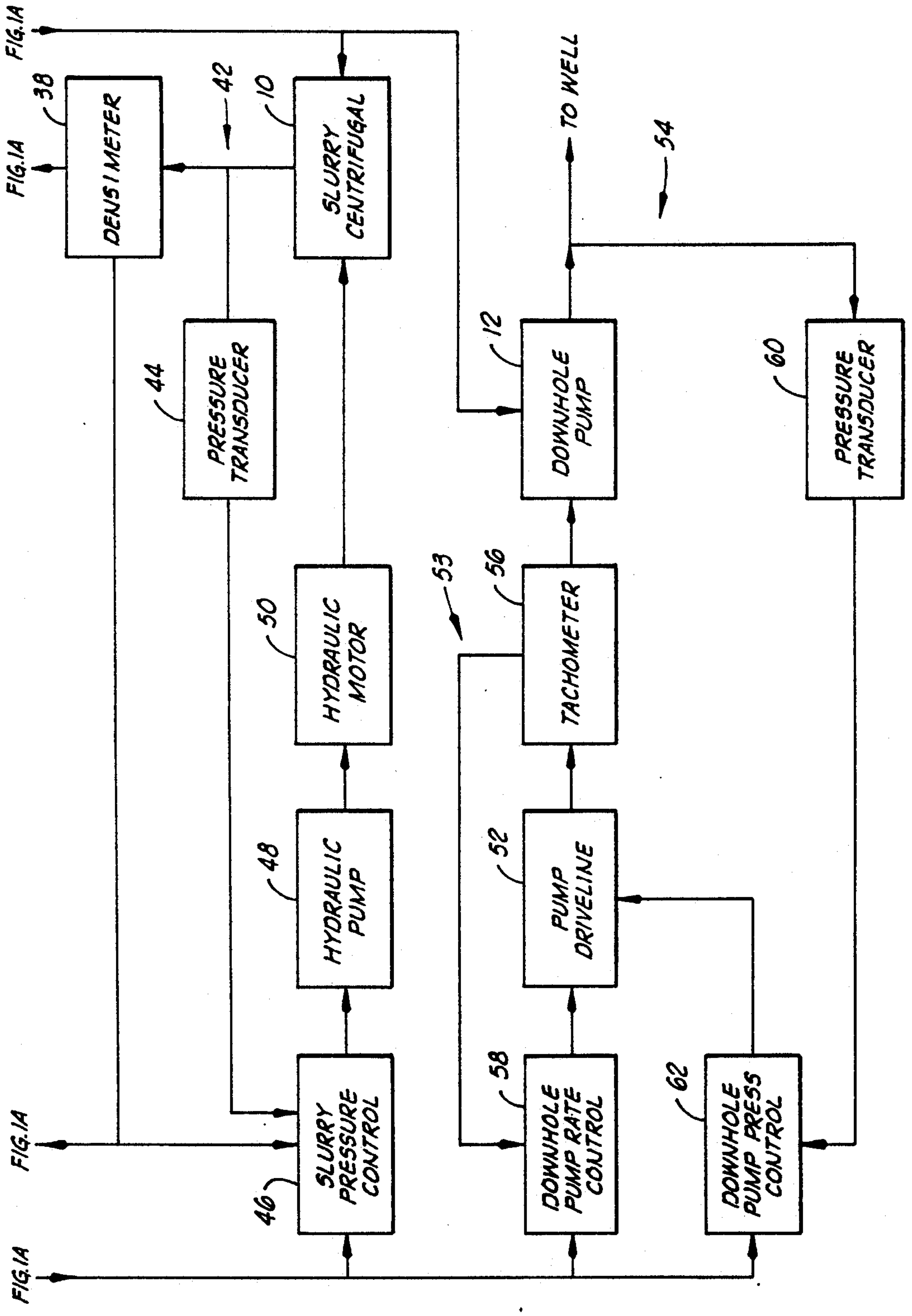

The control and flow circuit of the preferred embodiment system of the present invention is schematically illustrated in FIGS. 1A and 1B. Subsystems provide for automatic control of water pressure, water rate, slurry density, recirculating slurry pressure, and downhole pump rate. Each subsystem operates independently but in response to control from a central controller. At least as to the water rate control subsystem, the slurry density control subsystem and the downhole pump rate control subsystem, the central controller generates control signals interrelated by set points entered by an operator through an operator interface panel connected to the central controller. The central controller also provides set point control signals to the water pressure and the recirculating slurry pressure control subsystems. The subsystems function separately to simplify the control to single-input, single-output control loops that provide a more fault tolerant system.

Referring to FIGS. 1A and 1B, the system includes a mixing tub 2 in which a mixture of a base fluid (hereinafter referred to as water) and a dry material (hereinafter referred to as dry cement) is made. The water is controllably conducted through a flow controller embodied as a water valve 4. Water is pumped through the valve 4 by a centrifugal pump 6. The dry cement is input to the mixing tub 2 through a flow controller embodied as a cement valve 8.

The materials are mixed in the mixing tub 2 to form a cement slurry. This slurry can be recirculated by a centrifugal pump 10 to provide a mixture of more homogeneous character as known in the art. The cement slurry can be pumped from the mixing tub into the oil or gas well via a downhole pump 12.

The centrifugal pump 6 is controlled by a water pressure control loop 14. Water pressure is controlled through a hydraulic pump 16 which drives a hydraulic motor 18 that drives the pump 6. The output pressure of the water is measured with a pressure transducer 20 and fed back to a water pressure controller 22. A constant water pressure linearizes the water valve 4 and more efficiently utilizes hydraulic horsepower.

Water flow rate is controlled through a water flow rate control loop 23 that includes a hydraulic servovalve 24 which positions the water metering valve 4 via a rotary actuator 26. The resulting flow rate of the water pumped through the valve 4 by the pump 6 is measured with a flow meter 28 and fed back to a water rate controller 30. The controller 30, through a valve position controller 31 receiving feedback from the rotary actuator 26, automatically adjusts water valve position to maintain a constant water rate.

Cement density is controlled through a slurry density control loop 32 that includes a hydraulic servovalve 34 and rotary actuator 36 which position the cement metering valve 8. The dry cement powder is conveyed pneumatically through the cement metering valve 8 and blended with the water in the mixing tub 2. The centrifugal pump 10 recirculates slurry through a densimeter 38 which measures the slurry density. The density is then fed back to a slurry density controller 40 which provides a set point to a valve position controller 41 that receives feedback from the rotary actuator 35 and operates the hydraulic servovalve 34 to operate in turn the cement valve 8 for maintaining a constant density.

Automatic control of the slurry centrifugal pump pressure is provided via a slurry pressure control loop 42 in the same manner as the water pressure control loop 14. However, because the output pressure of the pump 10 is a function of fluid density, density correction is required. Fluid density as measured by the densimeter 38 is used to adjust the pressure set point so that a constant delivery is maintained by the slurry recirculating pump 10. The control loop 42 includes a feedback pressure transducer 44, a slurry pressure controller 46, a hydraulic pump 48 and a hydraulic motor 50.

The downhole pump 12 is driven by an engine/transmission identified as a pump driveline 52 in FIG. 1. This forms part of downhole pump rate control loops 53, 54. Pumping rate is controlled by manipulating engine throttle and transmission gears. Pumping rate is measured with a tachometer 56 and fed back to a downhole pump rate controller 58. Additionally, a limit on pumping pressure can also be programmed into the system. This pressure limit will override the rate set point if the pressure limit is reached before the rate set point is reached. Thus, pressure and rate are both controlled. Pressure control occurs via a pressure transducer 60, responsive to pressure of the slurry as it is pumped into the well, and a downhole pump pressure controller 62.

Although the foregoing control loops operate independently, they are interrelatedly controlled by a master controller so that the mixing of the cement slurry to achieve a desired density is related to the pumping of the cement slurry downhole. Such a master controller includes means for defining a plurality of set points representing desired operating characteristics and means for generating related control signals in response to the set points. In FIG. 1, the former is provided by an operator interface panel 64 and the latter is provided by a central controller 66. The operator interface panel 64 will be further described hereinbelow with reference to FIG. 3. The central controller 66 is implemented in the preferred embodiment by the Halliburton Services' ARC unit controller which is a microprocessor based control system. Such implementation of the central controller 66 also encompasses the water pressure controller 22, the water rate controller 30, the slurry density controller 40, the recirculating slurry pressure controller 46, the downhole pump rate controller 58 and the downhole pump pressure controller 62. That is, the controllers 22, 30, 40, 46, 58, 62 are implemented by programming the ARC unit controller in accordance with the present invention so that respective drive control signals are provided to the respective pumps 16, 48, 52 and the valves 4, 8. The water valve position controller 31 and the cement valve position controller 41 are external to the ARC unit controller, but they receive control signals therefrom and in response provide position control signals to the servovalves 24, 34, respectively.

Figure 2:
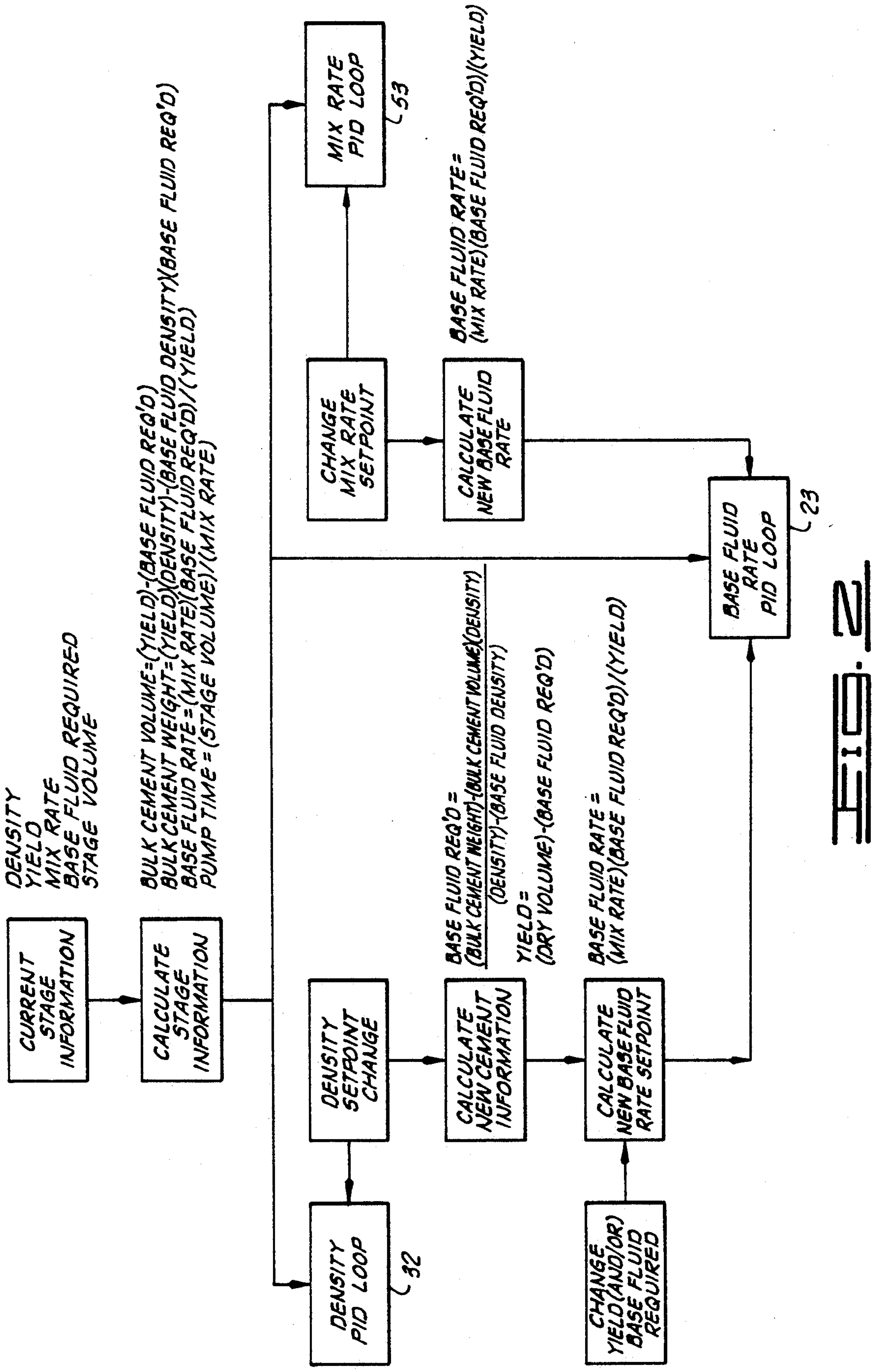
FIG. 2 is a flow chart showing the relationship between density, mix rate and base fluid rate control loops of the present invention.

The control provided by the central controller 66 and the controllers 30, 40, 58 is shown in FIG. 2. In response to desired density, yield, mix rate, base fluid required (per volume dry material) and stage volume set points being entered through the operator interface panel 64, the central controller 66 calculates bulk cement volume, bulk cement weight, bulk fluid rate and pump time as defined by the equations shown in FIG. 2. From these, control signals are provided to the respective control loops 23, 32, 53 as indicated in FIG. 2. FIG. 2 also shows that if any one of the original input operating characteristics is changed, automatic changes in related control parameters are automatically implemented. Thus, these automatic subsystems operate independently but are linked through their set points. For example, when the control loops are operating automatically, a change in mix rate set point (i.e., rate for pump 12) will result in a new calculated water rate set point for the valve 4.

The pressure control implemented via the controllers 22, 46, 62 is based on entered pressure criteria and a comparison thereof with actual pressure sensed by the transducers 20, 44, 60.

Preferably all of the foregoing components are implemented using equipment known in the art. For example, the system shown in FIG. 1 can be implemented using equipment from the Halliburton Services ARC control system or other Halliburton Services control systems (e.g., UNIPRO II system), except for modified computer programming for implementing the control relationships described herein, including those illustrated in FIG. 2. Furthermore, the particular combination of control loops and their interrelationships shown in FIGS. 1 and 2 are unique to the field of mixing and pumping cement into an oil or gas well.

The system of FIG. 1 can be installed on a truck or other vehicle so that it can be readily transported from well site to well site as a unified system. In a particular implementation, acid tanks can also be mounted on the vehicle and the system used in an acidizing job.

Figure 3:
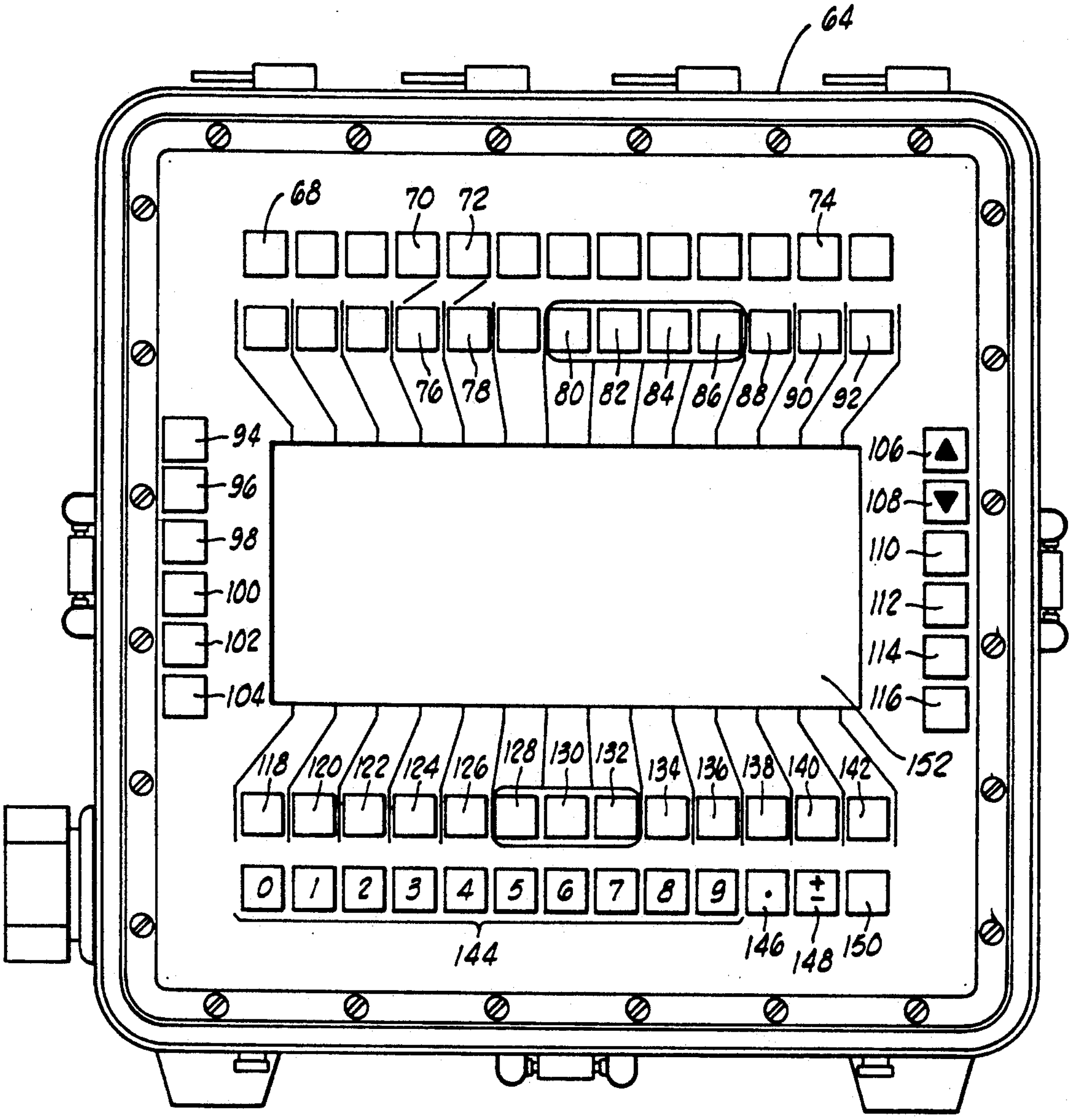
FIG. 3 is a front view of an operator interface panel of the system shown in FIG. 1.

A specific implementation of the operator interface panel 64 is shown in FIG. 3. This is the same interface panel as is used in the Halliburton Services ARC system except for at least some of the keys being marked with different indicia and providing different functions in response to being actuated. The keys of the specific implementation of the preferred embodiment of the present invention are as follows:

| Key Reference Numeral (FIG. 3) | Indicia | Function |
|---|---|---|
| 68 | units | Select English or metric units |
| 70 | driver tank fill | Open/close inlet valve |
| 72 | pass tank fill | Open/close inlet valve |
| 74 | agitator | Agitator speed control |
| 76 | driver tank drain | Open/close drain valve |
| 78 | pass tank drain | Open/close drain valve |
| 80 | preload density | Controls initial volume of cement |
| 82 | preload water | Controls initial volume of water |
| 84 | mix stage | Advance to next stage |
| 86 | yield | Yield entry |
| 88 | mix level | Adjust mix level |
| 90 | mix pump | Speed control for mix pump |
| 92 | recirc pump | Speed control for recirc pump |
| 94 | on | |
| engage | | |

-continued

| Key Reference Numeral (FIG. 3) | Indicia | Function |
|---|---|---|
| open | Activating key for other | |
| | | functions |
| 96 | off | |
| neutral | | |
| | Activating key for other | |
| | close | functions |
| 98 | alt | Alternate keyboard function |
| 100 | error/value | Select whether error or actual value is shown |
| 102 | display | Select optional screen displays |
| 104 | cursor | Activates screen cursor |
| 106 | "cursor up" (arrow) | Cursor/speed entry function |
| 108 | "cursor down" (arrow) | Cursor/speed entry function |
| 110 | auto/manual | Select operating mode |
| 112 | kill | Quick shutdown |
| 114 | reset | Reset parameters |
| 116 | enter | Data entry |
| 118 | main display | Return to Main Display screen |
| 120 | LA1 | Liquid additive pump speed control |
| 122 | LA2 | Liquid additive pump speed control |
| 124 | driver tank level | N/A |
| 126 | pass tank level | N/A |
| 128 | water | Open |
| close water valve in | | |
| | req'd/valve | mixer |
| 130 | density cement valve | Open/close cement valve in mixer |
| 132 | mix rate | Controls pump rate |
| 134 | pump 1 | Controls pump rate |
| 136 | pump 2 | N/A |
| 138 | density | Set mode of density control loop |
| 140 | low meter select | Select particular flow meter |
| 142 | hyd eng. speed | Controls engine speed driving hydraulic pump |
| 144 | "numeric keys" (numerals" | Data entry |
| 146 | "decimal point" (.) | Data entry |
| 148 | +/− | Data entry |
| 150 | all | Data entry |

In the center of the operator interface panel 64 is a display screen 152 on which various numerical and graphical interfaces can be displayed for communicating with an operator of the system of the present invention. Examples of these graphical interfaces are shown in FIGS. 4-11.

Figure 4:
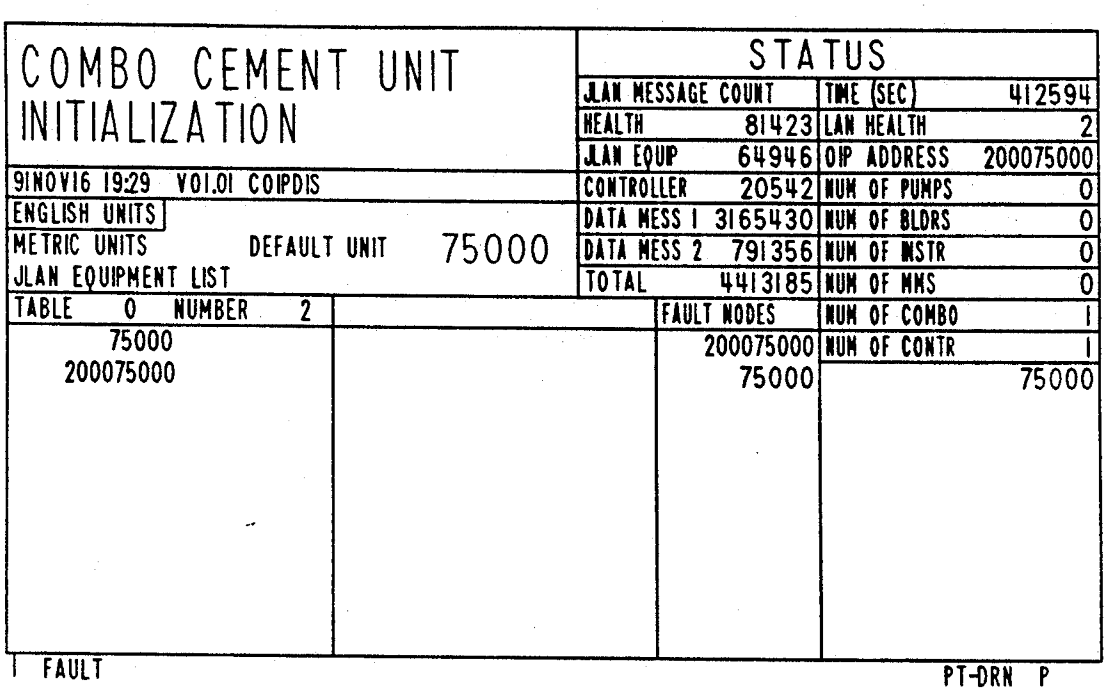

FIG. 4 shows a specific implementation of an initialization page which first comes up when the operator interface panel 64 of the present invention is turned on. The purpose of the initialization page is to inform the operator of all controllers attached via the communications network and also to choose the preferred unit of operation (i.e., English Standard or metric units).

A safety feature of the operator interface panel 64 is that two keys must be pushed together to perform an operation, which prevents accidental commands. Typically an action key (red) is pushed with a function key (white) to make a command. Red action keys are typically to the left and right of the display 152. White function keys are above and below the display 152. Only the MAIN DISPLAY key itself performs an operation (it brings the main display of FIG. 9 to the display 152).

Figure 5:
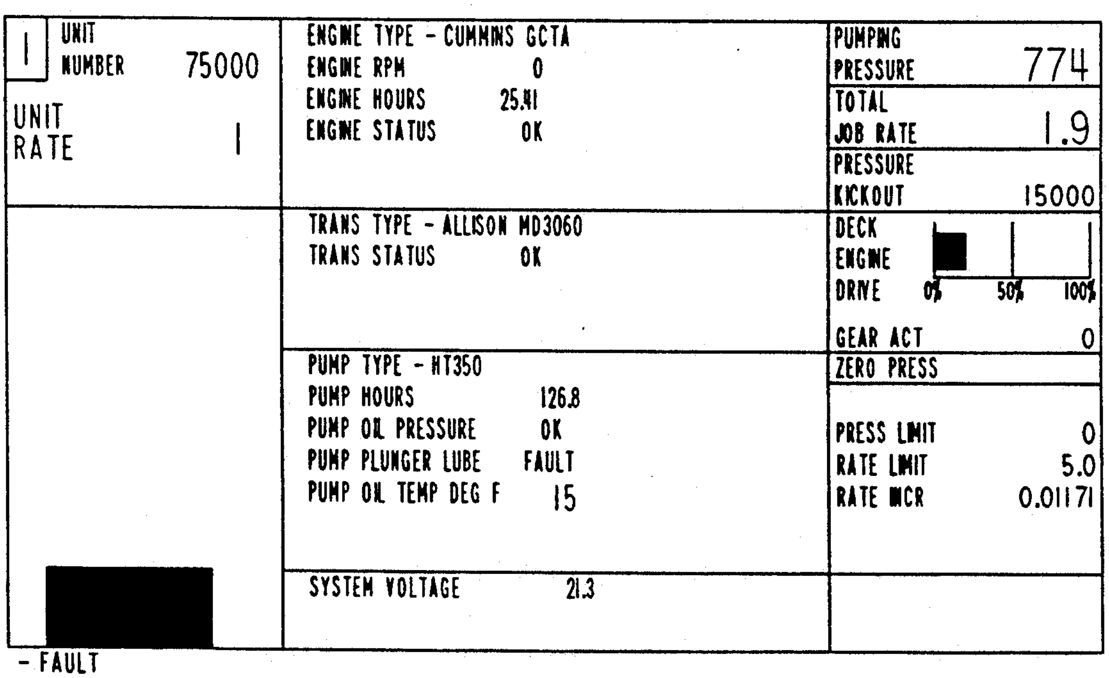

FIG. 5 shows the graphical interface for entering pump information relevant to the pump 12. To activate the "Pump" screen, press the DISPLAY and PUMP1 keys.

The pumping set points that can be entered are pump pressure limit, pump rate limit, and pressure kickout. The pump pressure and pump rate are limits the pump 12 will not exceed. When the pressure limit is reached, then the controller 62 automatically reduces the drive engine for the pump 12 to prevent exceeding the pressure limit, but the pump 12 is kept on line. Pressure kickout is a safety limit. If the pressure kickout set point is reached, then the controller 62 will shift the pump driveline 52 to neutral to take the pump 12 off line. Use the CURSOR and UP/DOWN (arrow) keys to change the set points. To deactivate these functions, enter a zero. In addition to the pump set points, the downhole pressure can be zeroed out from this screen. This allows the operator to remove the offset which may occur in a pressure transducer from zero shifting.

FIG. 6 is the interface screen for the transducer calibration page by which the pressure transducers are calibrated.

The "calibration" screen of FIG. 6 is activated by pressing the DISPLAY and 2 (numeric) keys. Use the CURSOR and UP/DOWN (arrow) keys to move the highlight box to the "Zero" location under the "Transducer Calibration" table. Under the "Zero" column, enter a 0 to rezero the respective pressure transducer listed in the table. Do not rezero a pressure transducer with fluid in the lines as this may cause a wrong calibration.

Additional parameters which may need rezeroing are volume totals. Volume totals are rezeroed under the "Volume Totals" table.

Other parameters on the calibration screen are fixed and generally do not need adjusting.

FIG. 7 shows the densimeter calibration page. Press the DISPLAY and DENSITY keys to activate the screen.

The "downhole densimeter" is not provided and will need calibrating. To enter calibration data for this densimeter, use the CURSOR and UP/DOWN (arrow) keys to move the highlight box to the top of the "New Set points" column of the "Downhole Densimeter" table. Holding the CURSOR button, enter the calibration data provided with the respective densimeter. Once the desired value is shown in the highlight box, use the CURSOR and ENTER keys to enter the value. After all the data points are entered, move the highlight box to the "Recalibrate" position and press the ENTER key. The new calibration points should appear under the "Current" column.

Additionally, a number of fluid calibrations are provided (see "WATER", "LO CAL", "BASE FLUID", "AIR" in FIG. 7). To calibrate a densimeter, use the CURSOR and UP/DOWN keys to move the highlight box to the desired calibration fluid and press ENTER. This should calibrate the densimeter to the fluid density that was selected.

The "Recirc Densimeter" table of the FIG. 7 screen should already have the correct calibration data for the recirculation densimeter 38. If the calibration data is wrong, then calibrating the recirculating downhole densimeter is done in the same manner as the downhole densimeter described above.

Figures 8, 9:
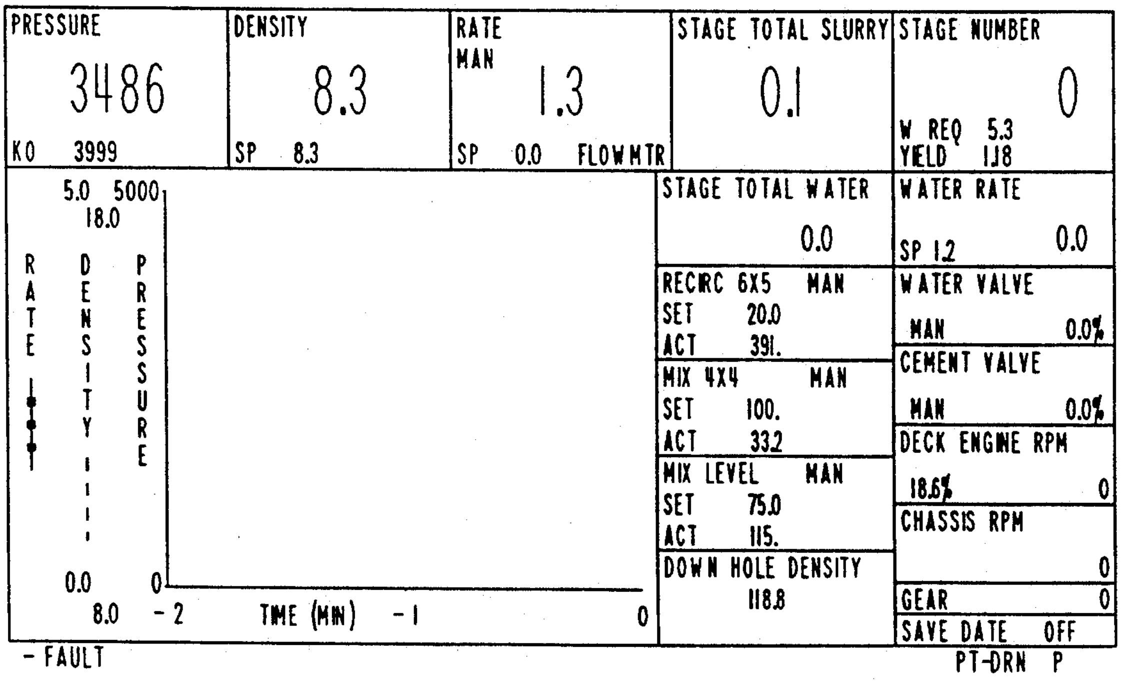

FIG. 8 shows the "Job Manager" screen through which the operator enters, prior to the cementing job being performed, required information including stage number, desired density, desired water requirement, desired slurry yield, desired mixing rate and desired stage volume. The central controller 66 will then calculate a required water rate for mixing. In the specific implementation illustrated in FIG. 8, space is provided for up to seven different cement blends. The controller 66 can totalize the volume of fluid pumped in each stage. This allows for automatic operation wherein the controller 66 will advance to a new stage when the programmed stage volume is reached. In manual operation, stages can be selected in any sequence or reselected by the operator. When a new stage is advanced, set points for water rate, density, and pumping rate are sent to the control loops 23, 32, 53 to control the respective functions.

Cement set points are entered before or during the job from the "Job Manager" screen. To make the screen active, press the DISPLAY and 3 (numeric) keys. The "Job Manager" screen gives values for the current or active stage as well as all the set points for stages 1–7. Changing or entering set points for a cement job is done under the column labeled "Setpts". To enter new set points or change existing set points, press the CURSOR key to activate a highlight box. Use the UP/DOWN (arrow) keys to move the highlight box to the desired position. When the highlight box is positioned, continue pressing the CURSOR key and enter the desired numerical value. After entering the value, press the CURSOR and ENTER keys to store the value. Continue entering data until all the correct values are entered. The following data is required:

Stage Number
Density (pounds/gallon; grams/cubic meter)
Water Required (gallons/sack; cubic meter/sack)
Yield (cubic feet/sack; cubic meter/sack)
Mixing Rate (barrels/minute; cubic meter/minute).

The controller 66 calculates the correct water rate based upon the above data.

Once all the data is entered, the values are shown under the "Setpts" column but are not stored permanently in the correct stage and are not used as active inputs. To store the set points in the correct stage and make the set points active, press the MIX STAGE and ENTER keys. Continue entering data for as many stages as desired.

To make a desired job stage current, press the MIX STAGE and UP keys. The controller 66 uses the current set points as the active inputs.

Figures 10, 11:
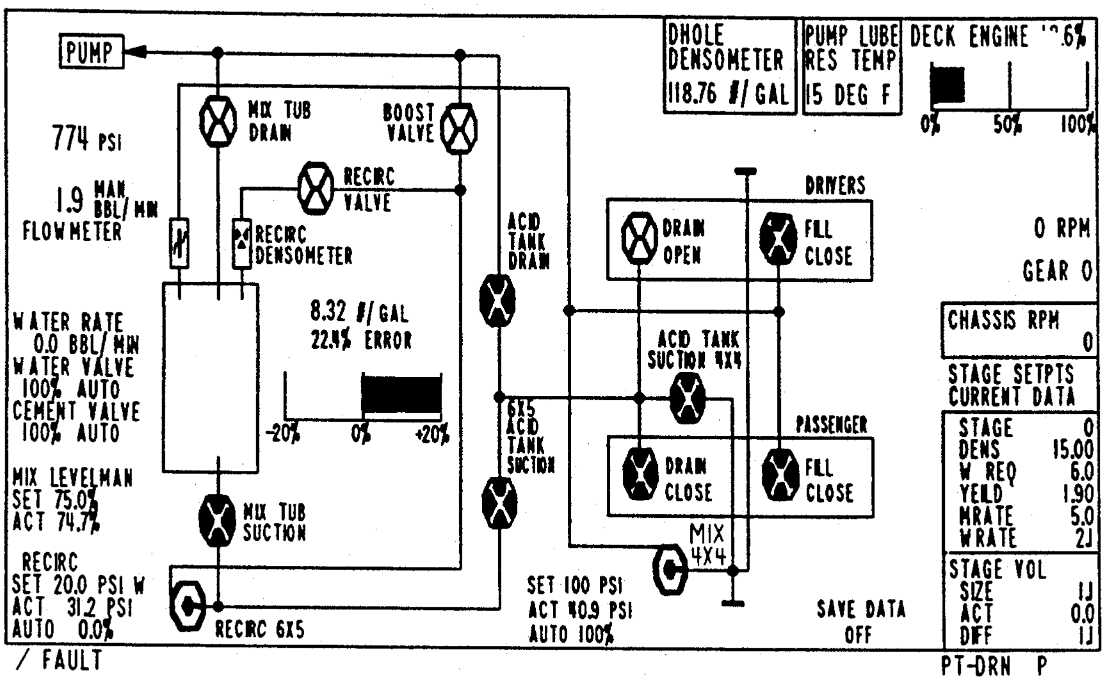

FIGS. 9 and 10 show alternative main display graphical interfaces, either of which can be selected by the operator to be displayed via the display 152 of the operator interface panel 64. The graphical interface shown in FIG. 9 numerically designates the variously listed parameters and it also graphically displays a real time strip chart of pressure, density, rate or other user selectable parameters. The graphical interface of FIG. 10 shows a computer generated flow circuit display or plumbing diagram that both graphically and numerically depicts operating conditions. Through either of the main display graphical interfaces, changes to the basic operating characteristics can be made "on the fly" when a cementing operation is in progress. Such changes include, for example, pressure set points for the centrifugal pumps 6, 10 (e.g., use the CURSOR and UP/DOWN (arrow) keys to move the highlight box to the "Recirc (6X5)" or "Mix (4X4)" locations; holding the CURSOR key, enter the desired pressure set point; after the desired value is shown, press the ENTER key).

A cementing operation includes, once all the requisite data has been entered, preloading the tub, beginning the job and changing set points as described as follows.

After all the set points are entered, then the job is ready to begin. Press the MIX PUMP and AUTO/MANUAL keys to put the mix water pump 6 in automatic.

With the mix water pump 6 engaged in manual or automatic, preload the tub 2 with water by pressing the PRELOAD WATER and ON/ENGAGE/OPEN keys. The preload water function meters the correct amount of water into the tub 2 based upon tub volume and water requirements of the particular cement blend.

After the tub 2 is preloaded with water, the recirculating pump 10 is turned on to bring water into the densimeter 38 and to help with mixing. Press the RECIRC PUMP and AUTO/MANUAL keys to put the recirculating pump 10 into automatic. Note that the pressure control loop 42 on the recirculating pump 10 is density compensated in order to maintain a constant delivery. In a particular implementation, the pressure set point is based upon water; therefore, when running cement the actual pressure is higher than the set point because of the higher density of the cement.

Turn on the agitator at this time to help with mixing by pressing the AGITATOR and UP (arrow) keys.

Calibrate the densimeter 38 with water if needed (see FIG. 7). Use the CURSOR and UP/DOWN (arrow) keys to move the highlight box to the recirculating densimeter location. Press the CURSOR and ENTER keys to calibrate the densimeter. The highlight box should contain the term "H2O".

With the recirculating centrifugal pump 10 running, preload the tub 2 with cement by pressing the PRELOAD DENSITY and ON/ENGAGE/OPEN keys. This opens the cement valve 8 to a fixed position and automatically shuts it when the desired density is reached.

After the tub 2 is preloaded, the job is ready to begin. Three ways are available to begin the job in automatic. One way is to press the MIX STAGE and AUTO/MANUAL keys. This action places all subsystems (except for the pressure loops on the centrifugals) into automatic in a predetermined order. A certain sequence is used to prevent spilling the tub. The first subsystem to begin operation is the one containing the pump 12. The pump 12 takes some time to reach the pump rate set point because of the shift schedule of the transmission. During this time the tub level will begin to drop to allow some capacity for the automatic density control subsystem. After the pump 12 has displaced a certain volume of cement, the density control subsystem will turn on the water and cement valves 4, 8 to begin putting new water and cement into the tub 2. When using this automatic way of mixing and pumping cement slurry, the correct set points must be current.

A second way includes pressing AUTO/MANUAL and ALL to place all systems into automatic.

A third way is to place subsystems into automatic separately. First, put the pump 12 into automatic by pressing the PUMP1 and AUTO/MANUAL keys. Because of the shift schedule of the transmission, the pump 12 will take some time to reach the desired rate. Allow the pump 12 to begin pumping and the tub level to drop a little before bringing cement and water into the tub. As in the other way, bringing the pump 12 on first should prevent spilling the tub 2 when bringing on the slurry. To begin bringing on cement and water, press the DENSITY and AUTO/MANUAL keys. This will place the water and cement valves 4, 8 into automatic. Using this technique, subsystems can be individually put into or taken out of automatic control. As one such system is placed in manual operation and changed, the others will automatically accommodate the change in response to such others' set points and internal feedback.

Changing set points during a job can be done by advancing stages. If the "Job Manager" screen of FIG. 8 was preprogrammed, then press the MIX STAGE and UP (arrow) keys. This will place the new set points in the current stage and automatically adjust the pump rate of the pump 12, the clean water rate through the valve 4, and the density control valve 8.

If the "Job Manager" screen of FIG. 8 was not preprogrammed or set point changes are desired in the current stage, then set point changes can be made via the "Job Manager" screen. Call the screen of FIG. 8 by pressing the DISPLAY and 3 (numeric) keys. Using the CURSOR and UP/DOWN (arrow) keys, enter the required information. After entering the new set points, press the MIX STAGE and ENTER keys. This will enter the new set point changes under the stage number that was programmed. Alternatively, set point changes in the current stage can be made from the Main Display (FIGS. 9 or 10). Use the CURSOR and UP/DOWN (arrow) keys to move to the desired set point location and enter a new set point. All other affected systems will be adjusted as required. For example, if a new density set point is entered, then a new yield, water requirement and water rate set point are calculated or similarly, if a new pump (mix) rate set point is entered, then a new water rate set point is calculated. The goal is to maintain equivalent mixing and pumping rates.

During and after such a cementing operation, graphical interfaces can be displayed through the operator interface panel 64 such as to show the pump history characteristics illustrated in FIG. 11.

The foregoing can be readily implemented by programming, using known programming languages and techniques, the controller 66 in accordance with the description given hereinabove and in the drawings forming a part of this disclosure. By way of example, a program listing for functions specified therein is set forth in the accompanying Appendix.

From the foregoing, it is apparent that the present invention provides related automatic control for both mixing one or more cement slurries and pumping the slurries downhole into an oil or gas well. The system preloads water and cement by metering the correct amounts of water and dry cement powder into the mixing tub 2 before the job begins. It allows for multiple stage information to be pre-entered before a cementing job begins whereby cementing job set point changes can be made during the cementing process. A maximum of seven job stages can be pre-stored in a specific implementation; however, this does not limit the number that may be utilized in other implementations. Advancing through the various stages can be done automatically or manually. The system also provides for automatic density control (including density feedback control of the cement valve 8, and manual override and set point adjustments from the main display screens of FIGS. 9 and 10 or the "Job Manager" screen of FIG. 8), automatic mix water rate control (including flow rate feedback control of the mix water valve 4), automatic mix water pressure control (including pressure feedback control of the mix water centrifugal pump 6), and automatic recirculating pump control (including pressure feedback control of the recirculating centrifugal pump and pressure control which is density compensated to maintain a constant delivery in the recirculation loop). The system also provides for automatic pump rate control of the pump 12 (including rate matching between shift points, manual override and rate set point adjustment via the operator interface panel 64, two stage idle providing for high idle for cool down, and automatic adjustment in the mix water set points in response to pump rate set point changes). The system also provides control of the pump 12 as to maximum pump rate and pump pressure limit and shifts the pump transmission to neutral when a pressure kick out is detected. Driveline information is also gathered providing status information of the pump 12, the engine and transmission. The system maintains lifetime totals of pump rate, pressure and horsepower.

The system of the present invention also enables the remote operation of the cementing process either from the primary operator interface panel 64 or from a secondary one via a local area network communication link. Remote data gathering can be provided via RS-232 communication protocol.

Thus, the present invention is well adapted to carry out the objects and attain the ends and advantages mentioned above as well as those inherent therein. While a preferred embodiment of the invention has been described for the purpose of this disclosure, changes in the construction and arrangement of parts and the performance of steps can be made by those skilled in the art, which changes are encompassed within the spirit of this invention as defined by the appended claims.

What is claimed is:

1. A system for mixing and pumping a cement slurry into an oil or gas well, comprising:

a mixing tub;

a first pump for pumping cement slurry from the tub into the well;

a base fluid flow controller for conducting a base fluid into the tub;

a master controller for controlling said first pump and said flow controller so that the mixing of the cement slurry responsive to said base fluid flow controller is related to the pumping of cement slurry by said first pump into the well, said master controller including:

means for defining a plurality of desired operating characteristics; and means for generating related control signals in response to said desired operating characteristics;

means for operating said first pump in response to at least one of said control signals; and means for operating said base fluid flow controller in response to at least one of said control signals.

2. A system as defined in claim 1, wherein said desired operating characteristics include a desired base fluid volume, a desired cement slurry density, a desired yield and a desired downhole pump rate.

3. A system as defined in claim 1, further comprising:

a densimeter for sensing density of the cement slurry;

a dry cement flow controller for conducting dry cement into the tub; and means for operating said dry cement flow controller in response to at least one of said control signals and said densimeter.

4. A system as defined in claim 3, further comprising:

a second pump for recirculating at least a portion of the cement slurry in the tub;

a pressure transducer for sensing a pressure of recirculated cement slurry; and means for operating said second pump in response to said densimeter and said pressure transducer.

5. A system as defined in claim 4, wherein:

said system further comprises:

a third pump for pumping base fluid into said base fluid flow controller;

a second pressure transducer for sensing a pressure of base fluid pumped by said third pump;

means for operating said third pump in response to said second pressure transducer; and a third pressure transducer for sensing a pressure of cement slurry pumped by said first pump; and said means for operating said first pump is also responsive to said third pressure transducer.

6. A system as defined in claim 5, wherein said desired operating characteristics include a desired base fluid rate, a desired cement slurry density, a desired yield and a desired downhole pump rate.

7. A method of mixing and pumping a cement slurry into an oil or gas well, comprising:

pumping water through a first control valve into a tub at the well;

conducting dry cement through a second control valve into the tub;

mixing the water and dry cement into a cement slurry in the tub;

recirculating cement slurry out of and back into the tub;

pumping cement slurry out of the tub into the well;

controlling the first control valve in response to a desired water flow rate and an actual water flow rate;

controlling the second control valve in response to a desired slurry density and an actual slurry density;

controlling the pumping of cement slurry in response to a desired downhole pump rate and an actual downhole pump rate; and defining the desired water flow rate, the desired slurry density and the desired downhole pump rate from an interrelated common data base of predetermined operating conditions.

8. A method as defined in claim 7, further comprising controlling the recirculating of cement slurry in response to a desired slurry recirculation pressure, the actual slurry density and an actual pressure of the recirculated cement slurry.

9. A method as defined in claim 8, wherein:

said controlling the pumping of cement slurry is also responsive to an actual pressure of the pumped cement slurry; and said method further comprises controlling the pumping of water in response to a desired water pressure and an actual water pressure.

10. A method as defined in claim 9, further comprising entering into a programmed computer the interrelated common data base of predetermined operating conditions for a selected plurality of different cement slurries to be sequentially mixed and pumped into the well.

11. A method as defined in claim 10, wherein the predetermined operating conditions include desired slurry density, desired yield, desired mix rate, desired water volume and desired total volume for each cement slurry.

12. A method as defined in claim 7, further comprising entering into a programmed computer the interrelated common data base of predetermined operating conditions for a selected plurality of different cement slurries to be sequentially mixed and pumped into the well.

13. A method as defined in claim 12, wherein the predetermined operating conditions include desired slurry density, desired yield, desired mix rate, desired water volume required per volume dry cement, and desired total volume for each cement slurry.

14. A method as defined in claim 7, further comprising changing at least one of the desired water flow rate, desired slurry density and desired downhole pump rate during operation and thereupon automatically changing the control of at least one of the first control valve, second control valve and pumping of the cement slurry out of the tub into the well.

15. A method of mixing and pumping a cement slurry into an oil or gas well, comprising:

controlling, with a computer, a flow of water into a mixing tub, a flow of dry cement into the mixing tub, and a flow of resultant mixture from the mixing tub into the well;

entering into the computer a plurality of operating characteristics for a plurality of different mixtures; and sequentially performing said controlling step for at least two of said plurality of different mixtures so that the at least two different mixtures are sequentially prepared in the mixing tub and placed in the well.

16. A method as defined in claim 15, wherein said entering includes actuating the computer to receive density, yield, mix rate, water volume and total volume data for each of the respective plurality of different mixtures.

17. A method as defined in claim 16, wherein said sequentially performing includes automatically switching from one controlling step using a first respective set of said data to another controlling step using a second respective set of said data in response to a calculated total volume for the prior controlling step equalling the entered total volume data for the respective prior controlling step.

18. A method as defined in claim 15, further comprising entering into the computer a change to at least one of the plurality of operating characteristics during at least one sequentially performed controlling step and thereupon automatically changing the control by the computer of at least one of the flow of water into the mixing tub, the flow of dry cement into the mixing tub, and the flow of resultant mixture from the mixing tub into the well.

19. A method as defined in claim 18, wherein said entering a change into the computer includes communicating with the computer through a graphical interface.

* * * * *